March 19, 1940.  H. ALLEN ET AL  2,194,263
VERTICALLY SPLIT HOUSING MANIFOLD VALVE
Filed July 2, 1937    3 Sheets-Sheet 3
FIG_3_
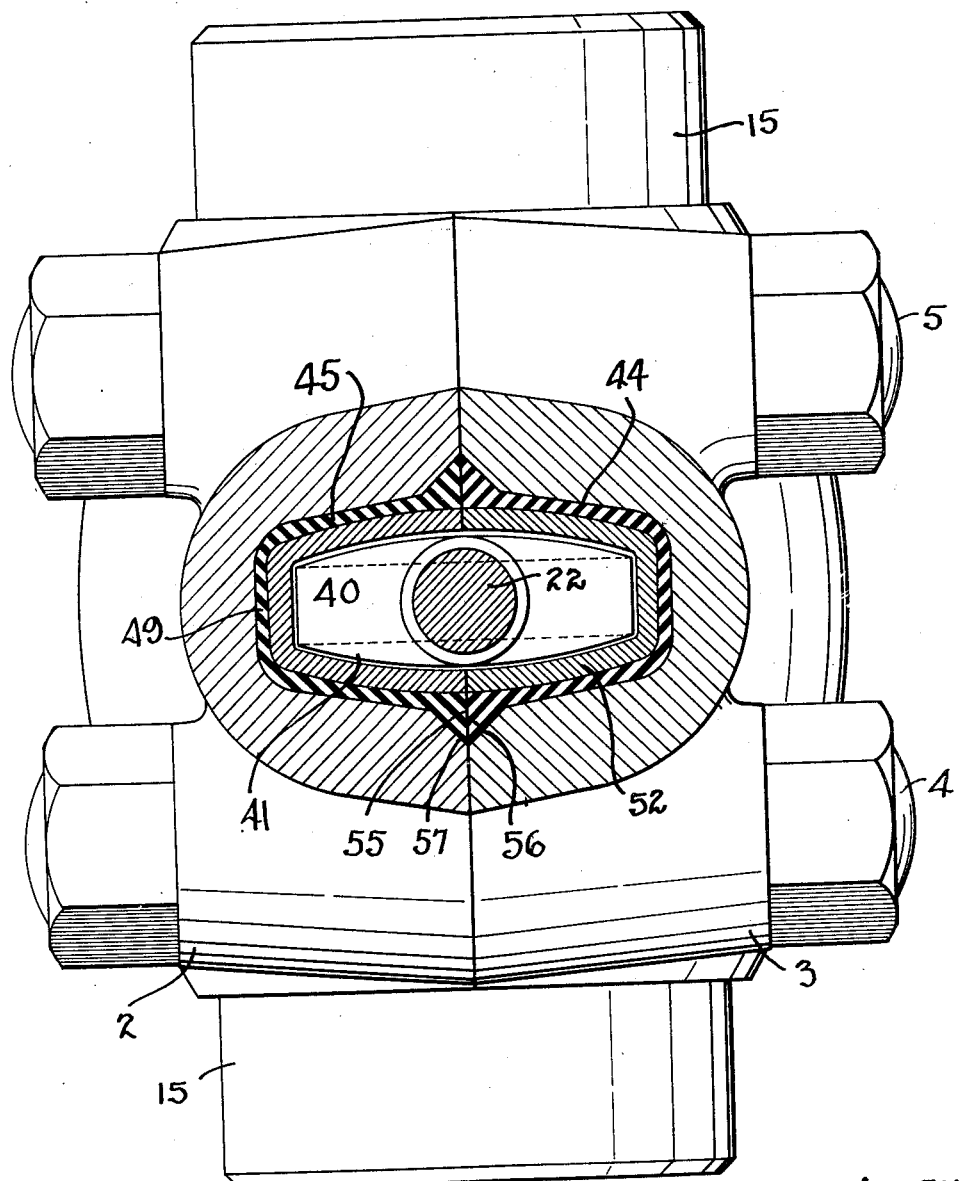
HERBERT ALLEN
MADDEN T WORKS
INVENTORS
BY Jesse R. Stone
Lester B Clark
ATTORNEYS.

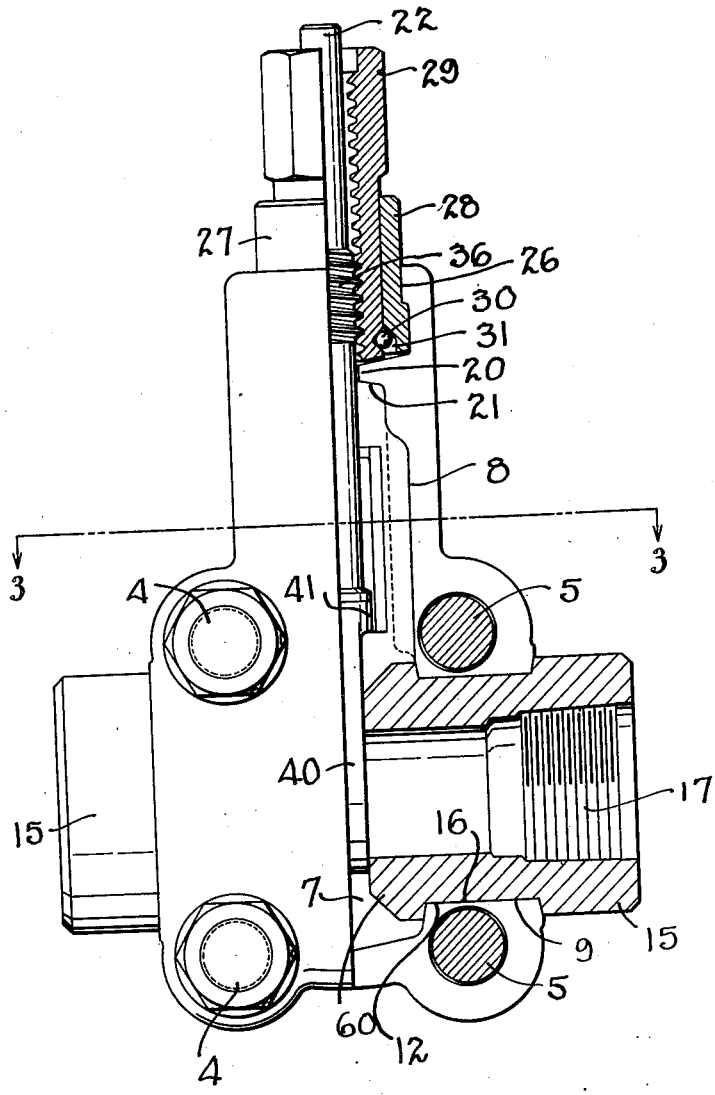

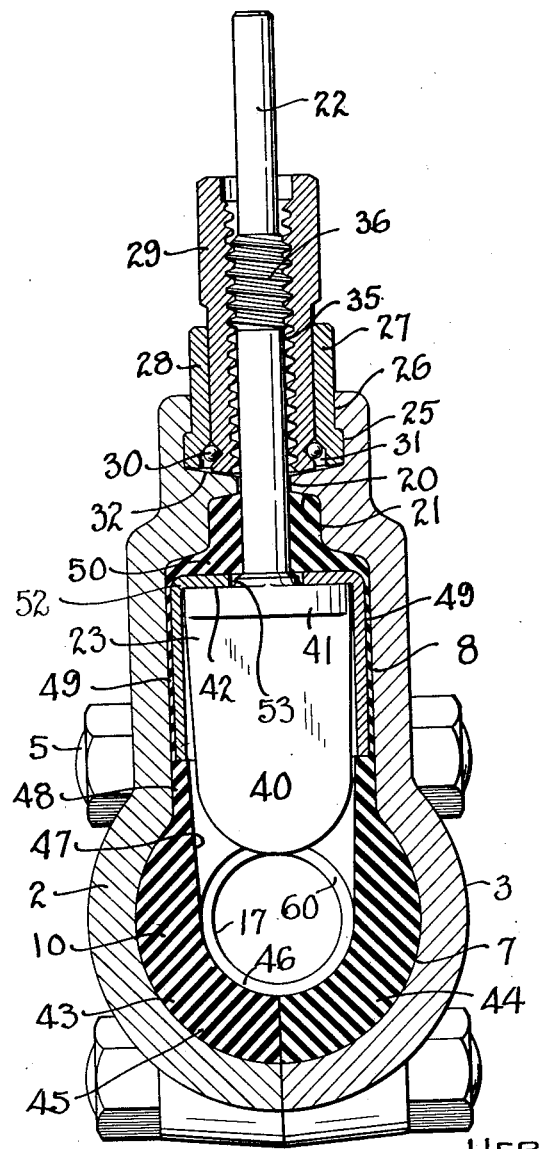

Patented Mar. 19, 1940

2,194,263

UNITED STATES PATENT OFFICE 2,194,263

VERTICALLY SPLIT HOUSING MANIFOLD VALVE

Herbert Allen and Madden T. Works, Houston, Tex., assignors to Cameron Iron Works, a corporation of Texas Application July 2, 1937, Serial No. 151,735

12 Claims. (Cl. 251—167)

The invention relates to a vertically split housing manifold valve wherein a resilient packing member is provided which will transmit the pressure applied to it by the valve member being moved to closed position so that a uniform pressure will be transmitted to all of the inside surfaces of the valve housing and against the surfaces of the valve member.

It is one of the objects of the invention to provide a split housing manifold valve to clamp the packing material in position when the parts of the housing are assembled.

Another object of the invention is to provide a two-part sealing member for a split housing valve so that upon assembly the packing material will be clamped in position.

Another object of the invention is to provide a packing member for valves which completely encloses the valve member so as to form a seal about the valve stem when the member is in open position and to receive the pressure of the valve member when it is in closed position so that a seal will be formed.

Other and further objects of the invention will be readily apparent when the following description is considered in connection with the accompanying drawings wherein:

Fig. 1 is a side elevation partly in section illustrating the halves of the housing and showing the valve member in closed position with the packing omitted.

Fig. 2 is a transverse section of the construction and illustrating the positioning of the packing with the valve member in open position.

Fig. 3 is a transverse section taken on the line 3—3 of Fig. 1 but having the packing deposited in position in the valve housing.

In Fig. 3 the valve housing is best seen in plan view and is made up of two identical half portions 2 and 3. It will be observed that the split to form the halves is longitudinally of the valve so that all of the parts of the valve may be assembled and then held in position when these two half portions are clamped together by the bolts 4 and 5.

As seen in Fig. 2, each of these half portions is of a peculiar configuration in that it is formed with a recess 7 which constitutes an intersection of the valve chamber 8 and the flow line passage 9, this intersection being somewhat enlarged in order to receive the packing member which is indicated generally at 10. Each of these members is further recessed at its upper end in order to form the valve chamber 8. At the ends of the recess 7 there is a restricted portion which forms a neck 12 and defines the fluid passage through the valve member. It is understood, of course, that half of this recess forming the passage 9 is disposed in each of the halves 2 and 3.

A pipe fitting or nipple 15 is provided with a reduced area 16 which is received in the neck portion 9 and whereby the fitting is securely clamped in position when the bolts 4 and 5 are drawn together. This fitting 15 has the passage 17 therethrough which forms the flow passage for the fluid which is to be controlled by the valve. One of these fittings is positioned at each end of the valve member.

The upper end of each of the parts 2 and 3 has a reduced area 20, which is defined by a shoulder 21 and which reduced area is arranged to fit about the stem 22 of the valve member 23. Above this neck 20 is an enlarged area 25 and another reduced area 26 so that the bushing assembly 28 may also be clamped in position when the halves 2 and 3 are affixed together. This bushing assembly 27 includes the outside sleeve 28 and the threaded bushing 29. This bushing 29 is held in position in the sleeve 28 by means of anti-friction locking balls 30, a series of which are disposed in the groove 31 and held in position when the parts abut against the face 32 of the halves 2 and 3.

It seems obvious that the sleeve 28 and bushing 29 can be assembled by disposing the balls 30 in that portion of the groove in the bushing and then sliding the sleeve 28 longitudinally over the parts, so that the two parts will be locked together when they are clamped against longitudinal movement by the neck 26.

The bushing 29 is internally threaded at 35 to receive the threaded area 36 on the stem 22. In this manner rotation of the stem causes it to travel vertically and in this manner the valve member 23 is moved to and fro to open or closed position.

The valve member is made up of a vertical spade portion 40 which is surmounted by a head 41 which extends laterally from each side of the spade and terminates in an upper shoulder 42, to which the stem 22 is attached.

The packing assembly 10 is made up of the halves 43 and 44 which are identical in construction and are split longitudinally of the valve member. Each of these halves is made up of a base portion 45 which contains a substantial body of resilient material whose outer surface is formed to the configuration of the recess 7 and whose inner surface is curved at 46 on the inside, which surface is in turn joined by the vertical face 47 which extends upwardly from the base. The outer curved surface extends from the base in the outer vertical face 48 to form a thin wall or shoulder portion 49 which extends up into the valve chamber 48. Above this thin wall 49 is a thickened web 50 which extends inwardly to abut against the shoulder 21 and surround the valve stem 22.

Disposed inside of the wall 49 is a reenforcing cap 52, which may be formed of metal and has an opening 53 therein so that the valve stem 22 may extend therethrough. The upper portion of this cap is arranged to abut the end 42 of the head of the valve member 23.

As seen in Fig. 3 the meeting edges 55 of the portions 44 and 45 are thickened as at 56, where they come into engagement and the halves of the valve housing 2 and 3 are each cut away to provide the beveled faces 57. In this manner when the parts are assembled and the bolts 4 and 5 drawn up, then the halves of the valve housing will move together and clamp the thickened areas 56 between the faces 57 to insure a seal to prevent leakage.

The packing halves 44 and 45 will be recessed at their ends in order to receive the inner end 60 of each of the fittings 15.

In operation, the parts will be assembled and firmly held in position by the clamping bolts 4 and 5. When the valve member is moved to closed position it will abut the surface 46 of the packing halves 44 and 45, in order to apply pressure thereto. Due to the resilient nature of the packing this pressure will be transmitted throughout the packing to form a seal with all of the inside faces of the valve housing and against all of the faces of the valve member. A seal will also be formed about the inner end 60 of the fittings and a complete seal in this manner maintained.

When the valve member is moved to open position it is, of course, desirable to maintain a seal about the stem 22 and this is effected when the head 41 moves against the cap 52 so that pressure is applied to the thickened web 50 to force it against the face 21 and cause it to move inwardly about the valve stem 22.

Broadly the invention contemplates a valve construction which can be readily assembled and the various parts clamped in position due to the split housing construction.

What is claimed is:

1. A valve of the character described comprising a housing, said housing including a pair of complementary body members each constituting a vertical half of said housing, each member being recessed so that when assembled the recesses provide a valve chamber, a neck portion adapted to receive connecting fittings, and a neck portion adapted to receive valve stem bushings.

2. A valve of the character described comprising a housing, said housing including a pair of complementary body members each constituting a vertical half of said housing, each member being recessed so that when assembled the recesses provide a valve chamber, a neck portion adapted to receive connecting fittings, and a neck portion adapted to receive valve stem bushings, a resilient packing member disposed in said chamber, and a valve member to abut said packing to force it against the walls of the recesses to provide a seal.

3. A valve of the character described comprising a housing, said housing including a pair of complementary body members each constituting a vertical half of said housing, each member being recessed so that when assembled the recesses provide a valve chamber, a neck portion arranged to receive connecting fittings, and a neck portion arranged to receive valve stem bushings, a resilient packing member disposed in said chamber, a valve member to abut said packing to force it against the walls of the recesses to provide a seal, and means to clamp said body members together to confine said packing.

4. A valve of the character described comprising a housing, said housing including a pair of complementary body members each constituting a vertical half of said housing, each member being recessed so that when assembled the recesses provide a valve chamber, a neck portion constructed to receive connecting fittings, and a neck portion constructed to receive valve stem bushings, a resilient packing member disposed in said chamber, a valve member to abut said packing to force it against the walls of the recesses to provide a seal, and a connecting fitting in the neck at each end of said housing.

5. A valve of the character described comprising a housing, said housing including a pair of complementary body members each constituting a vertical half of said housing, each member being recessed so that when assembled the recesses provide a valve chamber, a neck portion whereby to receive connecting fittings, and a neck portion whereby to receive valve stem bushings, a resilient packing member disposed in said chamber, a valve member to abut said packing to force it against the walls of the recesses to provide a seal, a connecting fitting in the neck at each end of said housing, and a bushing in the valve stem neck.

6. A valve of the character described comprising a housing, said housing including a pair of complementary body members each constituting a vertical half of said housing, each member being recessed so that when assembled the recesses provide a valve chamber, a neck portion formed to receive connecting fittings, and a neck portion formed to receive valve stem bushings, a resilient packing member disposed in said chamber, a valve member to abut said packing to force it against the walls of the recesses to provide a seal, a connecting fitting in the neck at each end of said housing, a bushing in the valve stem neck, and means to clamp said body members together to confine said packing and to retain said fittings and bushing.

7. A valve comprising a two part housing, a valve member movable therein, a threaded area on said member, a rotatable bushing in said housing, a retaining sleeve clamped in place by said housing parts, and antifriction means disposed between said sleeve and bushing and rotatably retaining said bushing in said housing against upward movement upon closing of said valve member.

8. A valve housing, a valve chamber therein, a fluid passage through said housing transversely of said chamber, the intersection of the chamber and passage being enlarged, a resilient packing disposed in said enlarged intersection, a reduced portion on said packing extending upwardly in said chamber, a gate member movable in said chamber to abut said packing and force it into sealing engagement with said housing, said reduced portion extending over the top of said gate member to receive said member in open position to prevent leakage.

9. A valve housing, a valve chamber therein, a fluid passage through said housing transversely of said chamber, the intersection of the chamber and passage being enlarged, a resilient packing disposed in said enlarged intersection, a gate member movable in said chamber to abut said packing and force it into sealing engagement with said housing, said housing and said packing each including two vertical halves split axially of the valve, and means to clamp said housing halves together to confine said packing halves.

10. A valve packing of the character described comprising a substantially cylindrical base portion, a transverse passage therethrough for fluid, a valve chamber joining said passage, said packing comprising two vertical halves.

11. A valve packing of the character described comprising a substantially cylindrical base portion, a transverse passage therethrough for fluid, a valve chamber joining said passage, said packing comprising two vertical halves, the split being longitudinal of said passage.

12. A valve packing of the character described comprising a substantially cylindrical base portion, a transverse passage therethrough for fluid, a valve chamber joining said passage, said packing comprising two vertical halves, the split being longitudinal of said passage, and contact faces on the two halves of greater width than the thickness of the packing.

HERBERT ALLEN.
MADDEN T. WORKS.